Aug. 9, 1966     C. H. LANDERS     3,265,356
CHAIN TIGHTENER
Original Filed Oct. 26, 1960     2 Sheets-Sheet 1
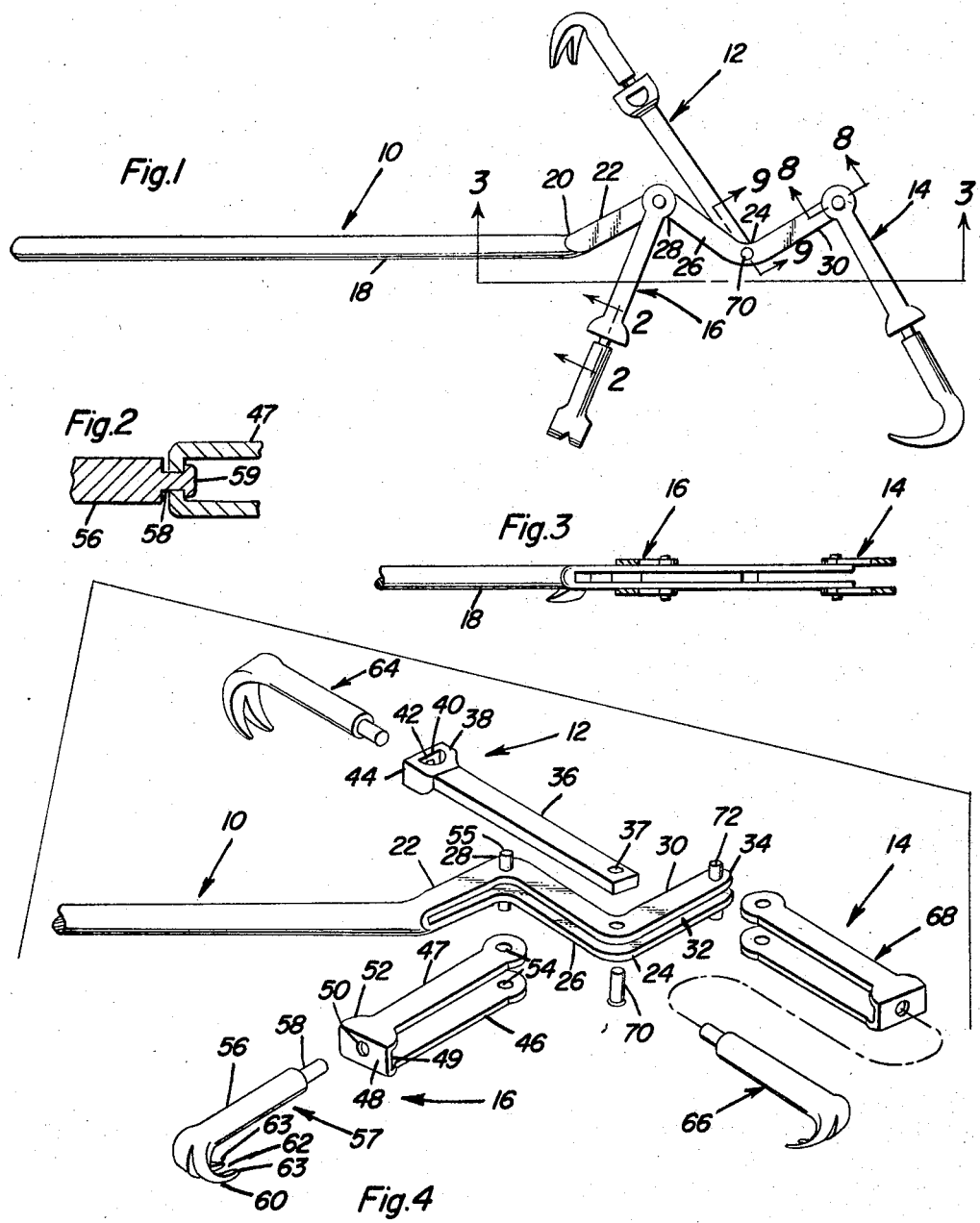
Charles H. Landers
INVENTOR.

Aug. 9, 1966 C. H. LANDERS 3,265,356
CHAIN TIGHTENER
Original Filed Oct. 26, 1960 2 Sheets-Sheet 2
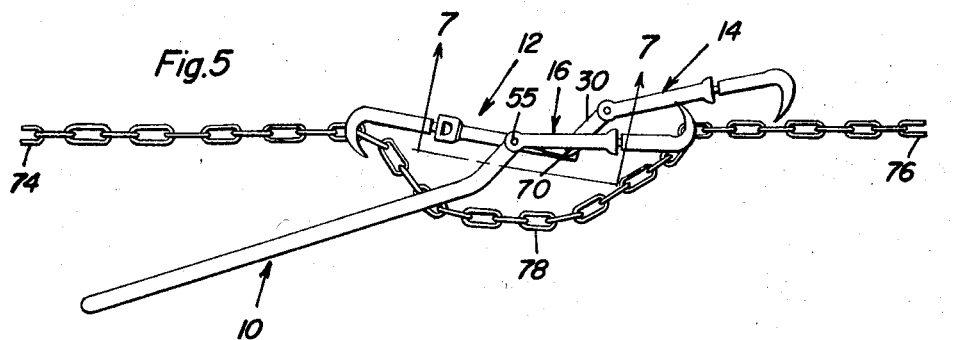
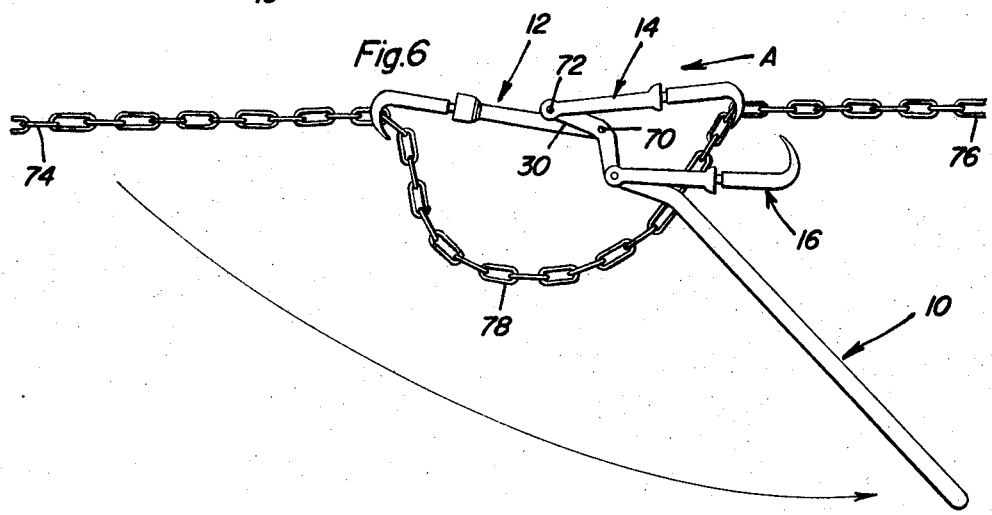
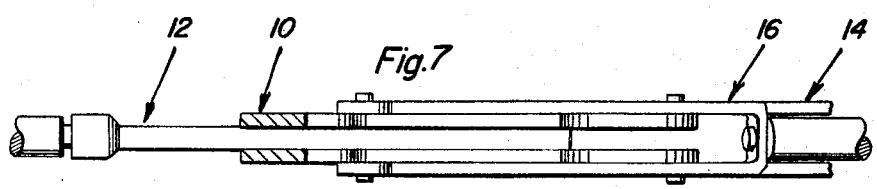
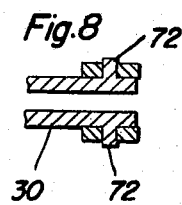 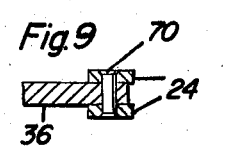
Charles H. Landers
INVENTOR.

United States Patent Office 3,265,356
Patented August 9, 1966

3,265,356
CHAIN TIGHTENER
Charles H. Landers, Gate, Okla.
Continuation of application Ser. No. 65,062, Oct. 26, 1960. This application Sept. 3, 1965, Ser. No. 489,791
7 Claims. (Cl. 254—75)

This invention relates to a device for applying high leverage and powerful tensile forces and this application is a continuation of my copending application, Serial No. 65,062, filed October 26, 1960, now abandoned.

More specifically, this invention relates to a handoperated tool for applying powerful tension forces with a minimum of manual effort. The invention is particularly adapted to tighten chains and gradually loosen them once they have become tightened.

Accordingly, it is an object of this invention to provide a device which has multiple purposes and many uses.

Another object of this invention is to provide a device which is particularly adapted for tightening chains, stretching wire, moving objects, and binding heavy loads, such as logs.

It is another object of this invention to provide a device that is capable of walking forward and backward on a log chain of any size.

Still another object of this invention, is to provide a device for locking tensioned members such as chains and wire in a tensioned condition once the device has tightened them.

Another object of this invention is to provide a hand tool that is simple in design and composed of a minimum of parts. Consequently, it is economical to manufacture and requires a minimum of maintenance.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is an elevational side view of my device;

FIGURE 2 is an enlarged cross-sectional view taken on the plane of line 2—2 in FIGURE 1;

FIGURE 3 is a bottom view of my device partially in section and taken on the plane of line 3—3 in FIGURE 1;

FIGURE 4 is an exploded view of my device in perspective;

FIGURE 5 is a side view of my device showing its initial application to a loose chain;

FIGURE 6 is a view similar to FIGURE 5 but shows my device after it has taken slack out of the chain;

FIGURE 7 is an enlarged view partially in section taken on the plane of line 7—7 in FIGURE 5;

FIGURE 8 is an enlarged cross-sectional view taken on the plane of line 8—8 in FIGURE 1; and FIGURE 9 is an enlarged cross-sectional view taken substantially upon the plane of line 9—9 in FIGURE 1.

My chain tightener is composed of four main subassemblies, namely, a handle assembly 10, a bar link assembly 12, an inner arm or clevis 16 and an outer arm or clevis 14. As shown in FIGURE 1, the handle assembly 10 comprises a rod having a handle 18 on its left end and having its right end bent substantially into a Z-shape for supporting the clevises and bar link assembly. The rod 10 is bent upwardly at 20 to form the inner support element or first leg 22, it is bent downwardly approximately eighty degrees at 28 to form the central support element or second leg 26 and is bent upwardly again at 24 substantially eighty degrees to form the outer support element or third leg 30. As shown more clearly in FIGURE 4, the support end of the rod 10 is flattened on both sides and on its upper and lower surfaces so as to be substantially square in cross section. The entire support section 22, 26 and 30 is then longitudinally slotted as shown at 32. The portions of the support at 24, 28 and at its outer end 34 are then drilled to receive pivot pins for the clevises and bar link.

The clevises 14 and 16, as more clearly shown in FIGURE 4 are each composed of a substantially U-shaped member composed of heavy gauge sheet metal comprising legs 46 and 47 joined together by a bight portion 49. The vicinity of the legs adjacent the bight portion are substantially semi-circular in shape and the outer ends of the legs are substantially circular in shape. The bight portion has a flat bearing surface 48 and is centrally apertured at 50 for pivotally receiving the claw elements 57 and 66. The other ends of the legs are apertured at 54 for receiving pins 55 and pins 72. The claw elements 57 and 66 are preferably formed from bar stock metal. One end of each of the shanks 56 of the claw elements is reduced in diameter as shown at 58 and the other end is flattened and tapered to a point. The flattened portion is then provided with a substantially V-shaped groove as shown at 62 so as to provide relatively sharp points 63 at one end of the claw element. The claw end 60 is then formed into a substantially semi-circular hook. As more clearly shown in FIGURES 2 and 4, the reduced diameter portion 58 of the claw elements are inserted into the apertures 50 and peened over at 59 so as to prevent axial separation of the claw elements from their supports but yet providing relative rotation therebetween. The clevises 14 and 16 are preferably identical in design and construction.

The bar link 12 is similar in design to that of the clevises. The bar link is composed of a substantially flat and rectangular support member 36 having an aperture 37 at one end and an enlarged head 38 at its other end integrally united therewith. The head 38 has a substantially semi-circular aperture 40 extending therethrough. The end of the head has a bearing surface 44 which in turn has an aperture 42 in a central portion which extends into the semi-circular opening 40.

Preferably the claw elements 57, 64 and 66 are all identical in shape and size. The claw element 64 has its reduced extension 58 extending through the opening 42 and has its end peened over in the same manner as the claw elements 57 and 66 as shown in FIGURE 2. The claw element 64 like the claw elements 57 and 66 is also rotatable relative to its support 36.

The bar link 12 extends into recess 32 of the handle assembly 10 and is pivotally connected thereto by pin 70 which may have its ends peened or enlarged. The U-shaped members of the clevises 14 and 16 straddle the handle assembly at 28 and 34 and are pivotally connected thereto by pins 55 and pins 72 which extend from the handle assembly and into the apertures 54 in the clevises. As more clearly shown in FIGURES 1, 4 and 7, the pins 72 and 55 are integral with the handle assembly outwardly therefrom so as not to block any portion of recess 32, which if blocked would interfere with the free pivotal motion of body 36 of the bar link 12. The pins 55 and pins 72 are preferably peened in the same manner as pin 70 as shown in FIGURE 9.

In operation, my device is particularly useful for taking the slack out of and thereby tightening chains. FIGURES 5 and 6 illustrate how my device operates in taking the slack out of or in tightening a chain. The handle member 10 is initially positioned substantially parallel to the loose chain with the clevises and bar link to the right of the handle as shown in FIGURE 5. The bar link 12 is hooked into one of the links on the left portion 74 of the chain and the outer clevis 14 is hooked into a right portion 76 of the chain.

As the handle 10 is rotated counterclockwise as illustrated in FIGURE 6, it pivots about the pin 70 at the end of the bar link and the upper end 30 of the handle assembly moves toward the left thereby pulling the clevis 14 and chain end 76 toward the left. Arrow A indicates the direction of movement of clevis 14 and chain end 76. As the clevis 14 and chain end 76 are pulled toward the left the slack 78 in the chain obviously increases as illustrated in FIGURE 6 and the ends 74 and 76 of the chain are thereby pulled closer together for tightening the chain.

To further tighten the chains, the bar link 12 remains fastened to the left portion 74 of the chain and the clevis 16, as shown in FIGURE 6, is hooked to the right portion of the chain 76 at a point which is several links to the right of clevis 14. The clevis 14 is then unhooked and the handle 10 is then rotated clockwise back to the position shown in FIGURE 5, thereby pulling the bar link 12 and the clevis 16 together and further tightening the chain. By thus walking the clevises 14 and 16 along the right side of the chain, the chain can be tightened any desired amount.

By operating the chain tightener in exactly the reverse manner as described above, it can be seen that the chain tightener may be used to gradually let out slack as well as take in slack.

Due to the Z-shape or non-aligned arrangement of pivots 70, 72 and 55 at the end of the handle 10, the chain tightener may be moved to a position after it takes up slack whereby it will be automatically locked by the tension of the chain in its tightened position. Referring specifically to FIGURE 5, when the handle 10 has been moved in a clockwise direction (from the FIGURE 6 position to the FIGURE 5 position) the bar link assembly 12 and the clevis 16 which are hooked to the chain portions 74 and 76, respectively, are pulled towards one another. By moving the handle 10 all the way up toward the chain portion 74, the pivot point 55 is moved above the pivot point 70 relative to a line extending between the claw elements on the bar link 12 and on the clevis 16 when engaging chain portions 74 and 76 respectively. As shown in FIGURE 5, tension in the chain portions 74 and 76 exerts a force along the line which extends between the engaging claw elements below which the pivot point 70 is located so that when pivot point 55 is displaced to a position above the line the handle will be in an overcenter position. In this over-center position, the tension on the chain portions 74 and 76 tends to further rotate the handle 10 in a clockwise direction. It will be obvious from the described structural arrangement and FIGURE 5 that continued clockwise rotation of the handle 10 is limited by abutment between surfaces on the portion 49 of the clevis 16 and the end portion of the clevis 14 through which pivot 72 extends, which limiting abutment together with the clockwise moment on the handle 10 caused by the tension on the chain portions 74 and 76 automatically locks the chain tightener. Without the Z-shaped end on the handle or the non-linear arrangement of the pivots 70, 72 and 55, it would be impossible to obtain this over-center position and the inherent rotational force whereby the device automatically becomes locked. In a like manner, the device may be also locked when the handle 10 is moved as far as possible in the counterclockwise direction (continued movement in the direction illustrated in FIGURE 6) and adjacent to the chain portion 76.

While I have found my device especially useful in tightening log chains, it may be adapted to tighten any type of chain. Not only is the device useful for tightening chains, but it may be used wherever a pulling or tensioning force is desired. For example, my device could be used for stretching fences or as an emergency means for pulling stuck vehicles.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tool defining a handle assembly including a support at one end and a handle at the other end, first and second arms, first and second pivot means connecting the first and second arms respectively at longitudinally spaced first and second points to the support, a link, said arms and link having means for engaging relatively movable bodies, third pivot means between said first and second pivot means connecting the link at a third point to said support, said third point being laterally offset from a straight line between said first and second points, said first, second and third pivot means being parallel and generally perpendicular to said support, said link and support defining means guiding movement of the link past both said first and second points to separate overcenter positions relative to said first and second pivot means.

2. A tool defining a handle assembly including a support at one end and a handle at the other end, first and second arms, first and second pivot means connecting the first and second arms respectively at longitudinally spaced first and second points to the support, a link, third pivot means between said first and second pivot means connecting the link at a third point to said support, said third point being laterally offset from a straight line between said first and second points, said first, second and third pivot means being parallel and generally perpendicular to said support, said link being movable past both said first and second points to separate overcenter positions relative to said first and second pivot means, and a separate connecting means carried by each of the free ends of said arms and link for applying a force to two relatively movable bodies, said support comprising first and second substantially parallel spaced legs having forward and rearward ends, a third leg inclined relative to said first and second legs, one end of said third leg fixed to the forward end of the first leg, the other end of said third leg fixed to the rear end of said second leg, said first point located at the forward end of the first leg, said second point located at a forward end of the second leg, said third point located at the rear end of said second leg, said first and second points located on one side of said support and said third point located on the other side of said support.

3. A tool as defined in claim 2 wherein said connecting means comprise hooks pivotally connected to the free ends of said arms and link.

4. A tool defining a handle assembly including a support at one end and a handle at the other end, first and second arms, first and second pivot means connecting the first and second arms respectively at longitudinally spaced first and second points to the support, a link, third pivot means between said first and second pivot means connecting the link at a third point to said support, said third point being laterally offset from a straight line between said first and second points, said first, second and third pivot means being parallel and generally perpendicular to said support, said link being movable past both said first and second points to separate overcenter positions relative to said first and second pivot means, and a separate connecting means carried by each of the free ends of said arms and link for applying a force to two relatively movable bodies, said support being longitudinally slotted, the pivoted end of said link being contained in the slot and said pivot means connecting the arms to the support being entirely exterior of said slot for permitting movement of said link past said first and second points and to said overcenter positions.

5. In combination with a flexible member adapted to be engaged at two spaced locations, a load binding tool comprising an elongated handle having a pair of spaced pivot points, tension applying means pivotally mounted by the handle about said spaced pivot points for alternative engagement with said flexible member at one of said two spaced locations, a third pivot point on said handle in laterally offset relation between said pair of spaced pivot points, link means engageable with the flexible member at the other of said two spaced locations for movement to a limit position in response to displacement of the handle in one direction about said third pivot point, and means pivotally mounting said link means on the handle about the third pivot point, said link means and handle defining means guiding movement of the link means past said spaced pivot points to said limit position for locking the handle against displacement in response to approach of the link means to said limit position.

6. The combination of claim 5 wherein said guiding means includes bifurcations on one of said link means and handle.

7. The combination of claim 1 wherein said guiding means includes bifurcations on one of said links and support.

References Cited by the Examiner
UNITED STATES PATENTS

| | | | |
|---|---|---|---|
| 1,650,328 | 11/1927 | Crumbach et al. | 254—75 |
| 3,218,031 | 11/1965 | Lucas | 254—75 |

WILLIAM FELDMAN, *Primary Examiner.*

OTHELL M. SIMPSON, *Examiner.*